United States Patent [19]

Muller

[11] Patent Number: 4,701,821

[45] Date of Patent: Oct. 20, 1987

[54] HELICAL SCAN TAPE RECORDER WITHOUT HEAD-TAPE CONTACT IN STAND-BY MODE

[75] Inventor: Johannes C. A. Muller, Eindhoven, Netherlands

[73] Assignee: U.S. Philips Corporation, New York, N.Y.

[21] Appl. No.: 769,813

[22] Filed: Aug. 26, 1985

[30] Foreign Application Priority Data

Jun. 3, 1985 [NL] Netherlands ..................... 8501583

[51] Int. Cl.$^4$ ..................... G11B 15/61; G11B 5/54; G11B 5/52
[52] U.S. Cl. ..................... 360/130.24; 360/84; 360/107; 360/105
[58] Field of Search ............ 360/84, 85, 107, 105, 360/130.22, 130.23, 130.24

[56] References Cited

U.S. PATENT DOCUMENTS

| | | | |
|---|---|---|---|
| 3,076,060 | 1/1963 | Horstkorta | 360/107 |
| 4,369,473 | 1/1983 | Eibensteiner | 360/85 |
| 4,381,530 | 4/1983 | Owada et al. | 360/130.23 |
| 4,459,626 | 7/1984 | Branger | 360/130.22 |
| 4,511,943 | 4/1985 | Fechner | 360/130.23 |
| 4,578,725 | 3/1986 | Muller | 360/85 |

FOREIGN PATENT DOCUMENTS

| | | | |
|---|---|---|---|
| 54-73616 | 6/1979 | Japan | 360/105 |
| 1255727 | 12/1971 | United Kingdom | 360/84 |
| 1107165 | 8/1984 | U.S.S.R. | 360/85 |

*Primary Examiner*—Stuart N. Hecker
*Assistant Examiner*—Benjamin E. Urcia
*Attorney, Agent, or Firm*—David R. Treacy

[57] ABSTRACT

The support for a magnetic head rotating about an axis is relatively movable with respect to a circular cylindrical guide surface which guides the tape past the path of the rotating magnetic head. In the playing mode, the rotation axis is coaxial with the cylindrical guide surface axis. In a stand-by mode either the bearing support for the rotating head assembly, or the cylindrical guide surface, is moved radially a small distance away from the other such that the head remains in contact with the guide surface, but is clear of the path swept by the rotating magnetic head. When the two portions of the device are moved back into coaxial alignment for the playing mode, a position device locates them accurately so that the two axes coincide.

8 Claims, 6 Drawing Figures

HELICAL SCAN TAPE RECORDER WITHOUT HEAD-TAPE CONTACT IN STAND-BY MODE

BACKGROUND OF THE INVENTION

The invention relates to a helical scan device for magnetically recording and/or reading signals in signal tracks on a magnetic tape, comprising a drive shaft which is rotatable about an axis of rotation; a first means secured to the drive shaft and, for carrying at least one magnetic head which is rotatable about the axis of rotation in a circular path; and a mounting carrying a second means, provided with an external cylindrical guide surface whose axis extends parallel to the axis of rotation, for guiding the magnetic tape along the magnetic head.

Devices of the type defined in the opening paragraph are known from Austrian Patent Specification No. 345577 (herewith incorporated by reference). In accordance with that Patent Specification the first means may be a head disc carrying the magnetic head. The head disc is mounted for rotation between a stationary lower and upper drum of the second means, both drums forming the guide surface for the magnetic tape. Alternatively, the first means may be constructed as a rotatable cylindrical head drum, in which case the second means is a stationary lower drum which is coaxial with the head drum and which is spaced therefrom by a narrow gap. The lower drum may be formed with a helical guide edge over a part of its circumference for guiding the magnetic tape along the magnetic head carried by the head drum. In the above-described known devices the rotatable head disc and the head drum occupy fixed positions relative to the lower drum, so that the magnetic head which is secured to the head disc or head drum is movable relative to the guide surface in an invariable circular path.

Devices for magnetically recording and/or reading signals in signal tracks on a magnetic tape are employed in apparatuses having, among other operating modes, a play mode and a stand-by mode. In the play mode the magnetic tape is wrapped around the guide surface at a specific angle by means of a threading mechanism, and the magnetic tape is movable over the guide surface and along the rotating magnetic head for the purpose of recording or reading signals. In the stand-by mode there is usually no magnetic-tape transport along the magnetic head. It is common practice to maintain the rotation of the head disc or head drum in the stand-by mode of the apparatus, in order to avoid a waiting time, required to bring the magnetic head up to speed, when changing over from the stand-by mode to the play mode. However, it has been found that when the head disc or head drum is stationary and the magnetic head is in contact with the magnetic tape, the magnetic head may be damaged seriously as a result of the frictional forces between the magnetic tape and the stationary magnetic head.

In order to avoid additional wear to the magnetic head and, possibly, the magnetic tape in the stand-by mode of the apparatus, a number of measures have been proposed in order to ensure that the rotating magnetic head cannot enter into contact with the magnetic tape in the stand-by mode. One of these measures has been proposed in Netherlands Patent Application No. 8201573 (to which U.S. Pat. No. 4,578,725 corresponds, herewith incorporated by reference). In this patent a magnetic-tape deck is described which comprises two rotatable magnetic heads and a drum having a cylindrical surface for guiding a part of a magnetic tape which is wrapped around the part of the drum, and which further comprises a mechanism for moving the magnetic tape from the drum into a stand-by position when the tape deck is in the stand-by mode. In this stand-by position the rotating magnetic heads are not in contact with the magnetic tape.

A drawback of the measure described in U.S. Pat. No. 4,578,725 for preventing the magnetic heads and the magnetic tape from coming into contact with each other in the stand-by mode, is that it takes a comparatively long time to thread the magnetic tape again around the drum starting from the stand-by position. In cases in which frequent use is made of the stand-by feature or in which stand-by and playing mode rapidly succeed one another this is undesirable and often even impermissible. Examples of such cases are data-processing equipment and camera recorders. In particular for camera recorders it is required that a suddenly occurring event can be recorded immediately.

Another measure is known from U.S. Pat. No. 3,076,060 (herewith incorporated by reference) and is employed in an apparatus for recording and reading video signals. This apparatus comprises a head disc which is rotatable about a fixed axis and carries a magnetic head by means of a radially movable carrier arm. The carrier arm is actuated by a mechanism which comprises a solenoid and a lever and latching device having a plurality of resilient elements. In the stand-by mode the lever and latching device ensures that the carrier arm with the magnetic head is brought into and maintained in a position within the circumference of the head disc, so that the rotating magnetic head cannot contact the magnetic tape. In the playing mode, in which the carrier arm is released by energizing the solenoid, the carrier arm with the magnetic head is moved outwards and subsequently pressed against the magnetic tape under the influence of centrifugal forces and spring forces. A disadvantage of this measure is in particular the intricate construction necessary to move the magnetic head away from and towards the magnetic tape and keep it in the relevant positions. Such a construction leads to expensive and vulnerable devices for recording and/or reading signals and is therefore not attractive for use in consumer products such as video recorders.

Yet another measure is disclosed in British Patent Specification No. 1,255,727 (herewith incorporated by reference) and is employed in a device comprising a conical head support which carries the magnetic heads and which is rotatable between a stationary lower and upper drum over which a magnetic tape is guided in the playing mode. The device comprises a plurality of flexible plungers for lifting the magnetic tape off the lower drum in the stand-by mode, so that the tape is no longer in contact with the rotating magnetic heads. The plunger elements are carried by a support accommodated in the lower drum and by means of an axial displacement of the support of their free ends are movable through inclined openings in the circumferential wall of the lower drum. A disadvantage of this measure is that in the stand-by mode the magnetic tape is supported only at a few locations, so that the ends of the plungers, which have only a limited contact area with the magnetic tape, may cause such high local material stresses in the magnetic tape that the magnetic tape is damaged.

Therefore, this construction demands a particularly effective tape-tension control. Moreover, the construction itself comprises a number of elements of very accurate dimensions, which obviously renders the construction expensive.

SUMMARY OF THE INVENTION

The object of the invention is to provide a helical scan tape recorder in, which simple yet reliable steps enable the position of the magnetic head and the magnetic tape on the guide surface, relative to each other, to be changed rapidly and exactly between a situation in which the magnetic head rotates without being in contact with the magnetic tape and a situation in which the rotating magnetic head enters into contact with the magnetic tape for recording or reading signals in signal tracks on the magnetic tape.

To this end the invention is characterized in that one of the two described means is movable relative to the other means in an at least substantially radial direction between a playing position, in which the rotating magnetic head is in contact with the magnetic tape which is guided by the guide surface, and a stand-by posiion, in which the rotating magnetic head is not in contact with the magnetic tape which is guided by the guide surface; and the device includes a positioning device for accurately positioning the relevant means in at least said playing position.

An advantage of the invention is that cheap and compact constructions are possible, which are not only suitable for use in stationary magnetic-tape recorders but also for use in portable recorders. Since the invention enables rapid switching from the stand-by position to the playing position, the device in accordance with the invention is particularly suitable for use in electronic cameras, film equipment and analog and digital data-processing equipment.

In order to ensure a statisfactory operation of the device in accordance with the invention, the magnetic tape should, in principle, be arranged around the cylindrical guide surface of the second means over a wrapping angle which is smaller than 180°. Very good results are obtained with a wrapping angle of approximately 90°.

A preferred embodiment of the invention is characterized in that the drive shaft carrying the first means is journalled in a sleeve which is coaxial with the axis of rotation and which is secured to the deck plate by an elastic element for moving the first means in a substantially radial direction between the operating position and the stand-by position.

In this embodiment the first means, which is generally a head disc or a cylindrical head drum, is movable relative to the second means, which generally comprises a one-part or two-part stationary drum. Preferably, the elastic element is an integral hinge which is integral with the second means and the sleeve, the integral hinge having a substantially rectangular cross-section and a hinge axis which extends parallel to the axis of rotation. Such a construction is cheap and has the advantage that the desired movement of the bearing bush relative to the deck plate can be very accurate, so that for moving the magnetic head between the stand-by position and the playing position only a small displacement is required. The characteristic is obviously desirable for reading the switching time between the stand-by position and the playing position. A suitable embodiment is characterized in that the positioning device comprises a stop on the mounting, and an electro-mechanical actuating device such as an electromagnetic or piezoelectric actuator for pressing the sleeve against the stop in the playing position. Such a positioning device responds rapidly and guarantees an accurately reproducible and stable position of the sleeve and hence of the rotating magnetic head in the playing position. Preferably, the elastic element has such a shape and occupies such a position between the deck plate and the sleeve that the elastic element subjects the bearing bush to forces which are directed away from the stop, so that the sleeve with the magnetic head is automatically pivoted from the playing position to the stand-by position when the actuating device is switched off.

In another preferred embodiment of the invention the second means is movably connected to the mounting and is movable in a substantially radial direction between the playing position and stand-by position. In this embodiment the first means, which as stated previously generally comprises a head disc or head drum, is rotatable in a fixed position relative to the deck plate. The second means, which comprises the guide surface, is preferably secured to the mounting by means of an elastic hinge in order to pivot the guide surface about a pivotal axis which extends parallel to the axis of rotation. This embodiment, like the afore-mentioned embodiment, has the advantage that it can respond rapidly and accurately when switching from the stand-by position to the playing position, so that signals recorded or read before and after a stand-by period accurately join one another.

The invention also relates to a magnetic-tape apparatus provided with a device as claimed in any one of the appended subsidiary claims, for recording and/or reading signals in signal tracks on a magnetic tape, and provided with tape-guide members for guiding the magnetic tape around the device.

Embodiments of the invention will be described in more detail, by way of example, with reference to the accompanying drawing.

DESCRIPTION OF THE PREFERRED EMBODIMENTS

Figure 1:
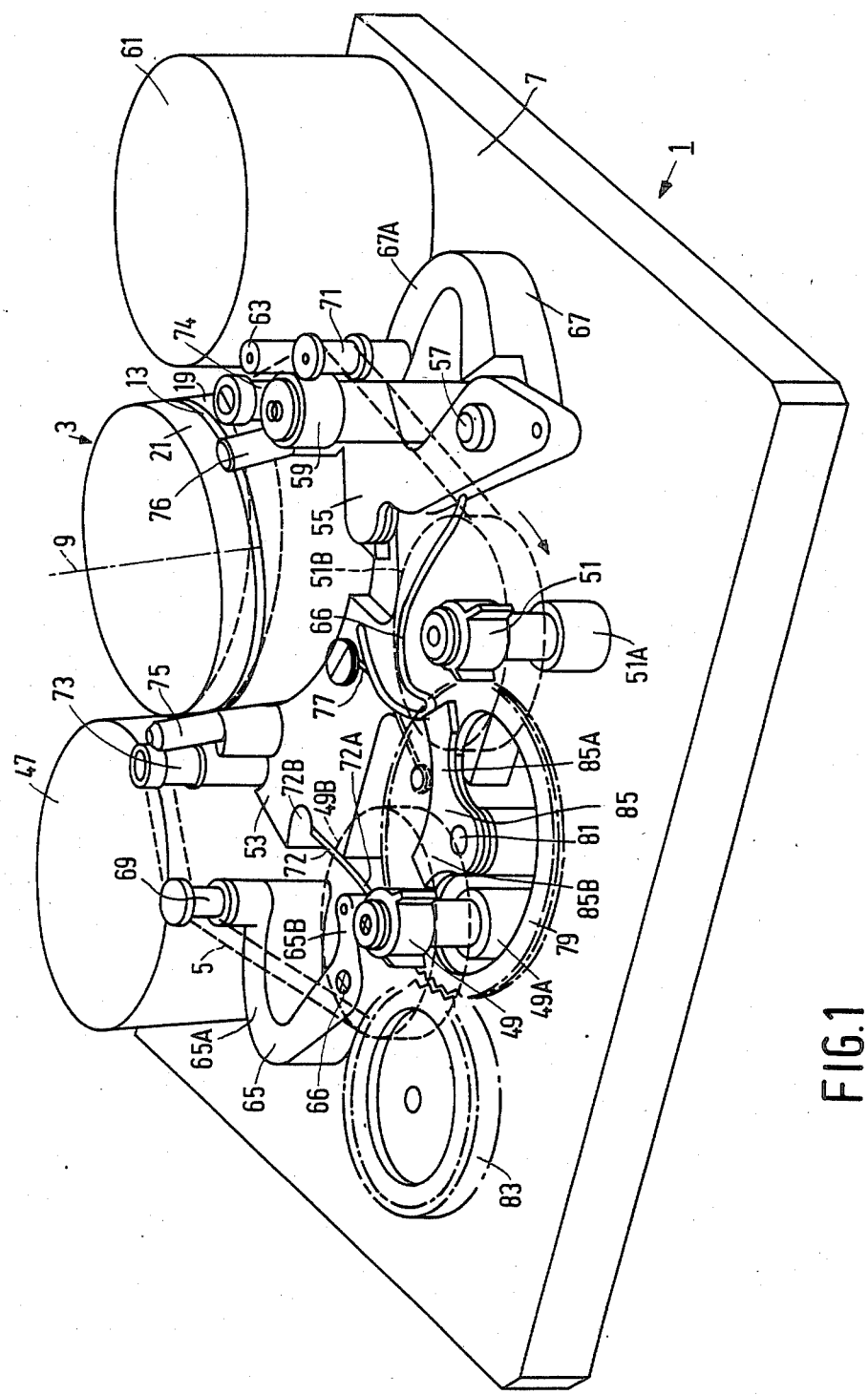
FIG. 1 is a perspective view of a magnetic-tape apparatus in which a device in accordance with a first embodiment of the invention is employed.

The magnetic tape apparatus shown in FIG. 1 comprises a device 3 in accordance with the invention for magnetically recording and reading digital signals on/-from a magnetic tape 5. The magnetic-tape apparatus 1 comprises a deck plate 7 on which the device 3 is mounted. The device 3, which is shown in more detail in FIGS. 2 to 4, comprises a drive shaft 11 which is rotatable about an axis of rotation 9 and to which a first means comprising a head disc 13 is secured. The head disc 13 carries two diametrically opposite magnetic heads 15, of which only one head is shown in the drawing. The device 3 further comprises a mounting 17 by means of which the device 3 is secured to the deck plate 7 and which carries a second means comprising a lower drum 19 and an upper drum 21. Between the lower drum 19 and the upper drum 21 a gap is formed in which the magnetic heads 15 can rotate.

The lower drum 19 and the upper drum 21 have external cylindrical guide surfaces 23 over which the magnetic tape 5 can be guided along a helical path for recording or reading inclined signal tracks on the magnetic tape 5 by means of the magnetic heads 15 during rotation of the head disc 13. A guide face 25 on the lower drum 19 ensures that the magnetic tape is supported correctly. Such a method of guiding the magnetic tape and such a method of recording and reading a magnetic tape are customary in every magnetic-tape video recorder and are therefore not described in more detail.

Between the head disc 13 and the lower drum 19 a rotary transformer is arranged, which includes a rotatable transformer ring 27 which is concentric with the axis of rotation 9 and which is secured to the rotatable head disc 13, and a stationary transformer ring 29 which is secured to the lower drum 19 and which is disposed opposite the rotatable transformer ring in such a way that a narrow axial gap is formed. The transformer rings 27 and 29 serve for the contactless transmission of signals to and from the rotating magnetic heads via the air gap between these rings.

The drive shaft 11 carrying the head disc 13 with the magnetic heads 15 is journalled in a sleeve 35 by means of two ball-bearings 31 and 33. The sleeve 35 is coaxial with the axis of rotation 3 and is integral with the lower drum 19 and the upper drum 21, which are made of for example aluminium. A connecting member 37, which extends between the sleeve 35 and the lower and upper drum 19 and 21, is tangentially constricted at the side near the lower and upper drum to form an elastic integral hinge 39 having substantially rectangular cross-section and having a longitudinal axis which extends parallel to the axis of rotation 9. Alternatively, the integral hinge 39 may be made of a plastic material.

Figure 4:
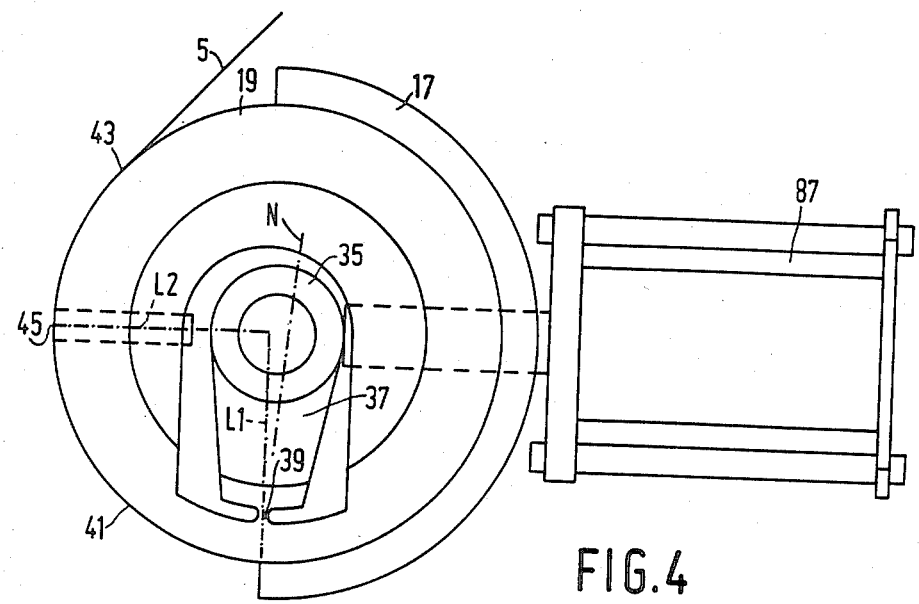
FIG. 4 is an underneath view of the first embodiment, in which the head disc is shown in the stand-by position.

In this first embodiment, as is visible in particular in FIG. 4, the magnetic tape 5 is guided along the guide surface 23 over 90 degrees of arc between a tape-guide entry point 41 and a tape-guide exit point 43. The integral hinge 39 is so positioned relative to the guide surface 23 that a normal L1 to the cylindrical surface of the lower drum 19 or the upper drum 21 and extending through the integral hinge 39 extends perpendicularly to a normal L2 to the guide surface 23 in a tape guide point 45 which is situated halfway between the tape-guide entry point 41 and the tape-guide exit point 43.

FIG. 1 shows that the axis of rotation 9 of the drive shaft 1 extends obliquely to the deck plate 7. The drive shaft and the head disc 13 are driven by means of a drive motor 47, which is arranged adjacent the device 3 in accordance with the invention. The normal direction of rotation of the head disc 13 is indicated by the arrow R.

Two winding spindles 49 and 51 are arranged above the deck plate 7 at a distance from each other. The winding spindles 49 and 51 are rotatable on journals 49A and 51A which are secured to the deck plate 7. The winding spindles 49 and 51 have axes of rotation which extend perpendicularly to the deck plate 7 and engage reels 49B and 51B, between which the magnetic tape 5 can be transported. A sliding plate 53 is arranged rectilinearly slidable along upper side of the deck plate 7 between the position shown in FIG. 1, which corresponds to the normal operating position of the sliding plate 53 or the playing position of the magnetic tape apparatus, and an initial position, which is situated farther from the device 3.

A pressure-roller lever 55 is mounted on the upper side of the deck plate 7 for pivotal movement about a pivotal axis 57. Near one end the pressure-roller lever 55 carries a pressure roller 59 which is adapted to cooperate with a capstan 63, which is journalled in the deck plate 7 and which can be driven by an electric motor 61. The deck plate 7 further carrries two pivotal arms 66 and 67, the pivotal arm 65 being pivotable about a pivotal axis 66 and the pivotal arm 67 being pivotable together with the pressure-roller lever 55 about the pivotal axis 57. Each of the pivotal arms 65 and 67 comprises a first limb 65A and 67A respectively, which near its free end carries a tape guide 69 and 71 respectively having a cylindrical guide surface. Further, the pivotal arms 65 and 67 each comprise a second limb having a free end for cooperation with the plate 53. For this purpose the plate 53 is provided with guide edges on opposite sides. In the drawing only one of the two limbs, namely 65B and one of the guide edges 72 is visible. In the position shown, which is the operating position of the plate 53, the ends of the second limbs abut against elastic end portions 72A of the guide edges 62. These end portions are bent slightly outwards. This ensures a correct and stable positioning of the tape guide 60 and 71. During the movement of the plate 53 the ends of the second limbs move along the guide edges 72 until the sliding plate 53 has reached the initial position; the end portions of the second limbs are then stably retained in the cavity 72B.

For guiding the magnetic tape 5 around the device 3 tape guides 73, 74, 75 and 76, are provided, mounted on the sliding plate 53. By means of a blade spring 77 the sliding plate 53 is coupled to a servo wheel 79, which is mounted on a journal 81 on the deck plate 7. A drive unit, not shown, is coupled to the servo wheel 79 via a gear wheel 83 and provides the displacement of the sliding plate 53. A bellcrank lever 85 mounted on the servo wheel 79 cooperates with a wire spring 66 in order to move and position the pressure roller 59. In the position shown, in which the sliding plate 53 is positioned accurately relative to device 3, a first end 85A of the bellcrank lever 85 is pressed against the wire spring 66, so that this spring exerts a force on the pressure-roller lever 55 and the pressure roller 59 is thus pressed against the capstan 63 under spring force. As a result of the rotation of the servo wheel 79 a second end 85B of the bellcrank lever 85 is positioned against the wire spring 66.

Figure 2:
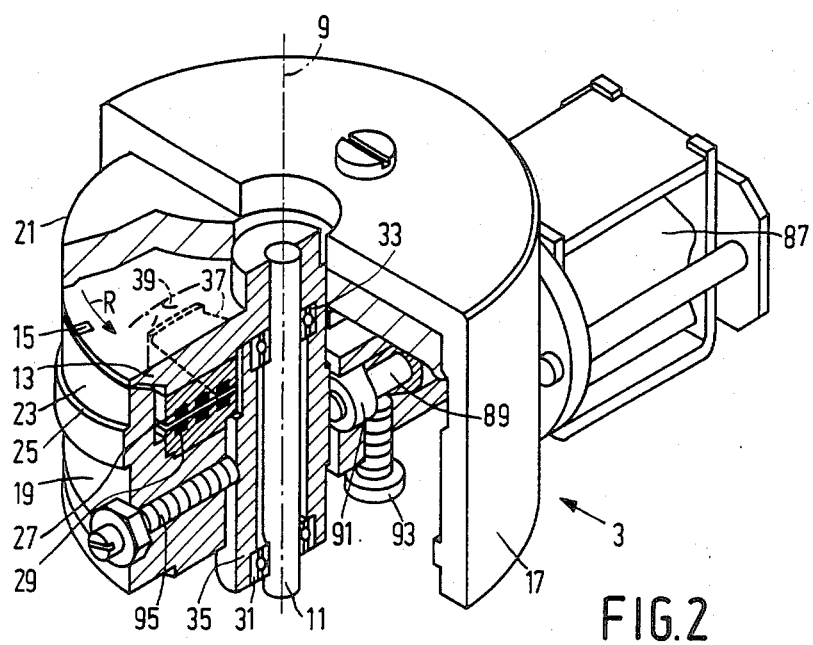
FIG. 2 is a perspective view, partly sectional view of the first embodiment, comprising a movable head disc which is in the playing position.
Figure 3:
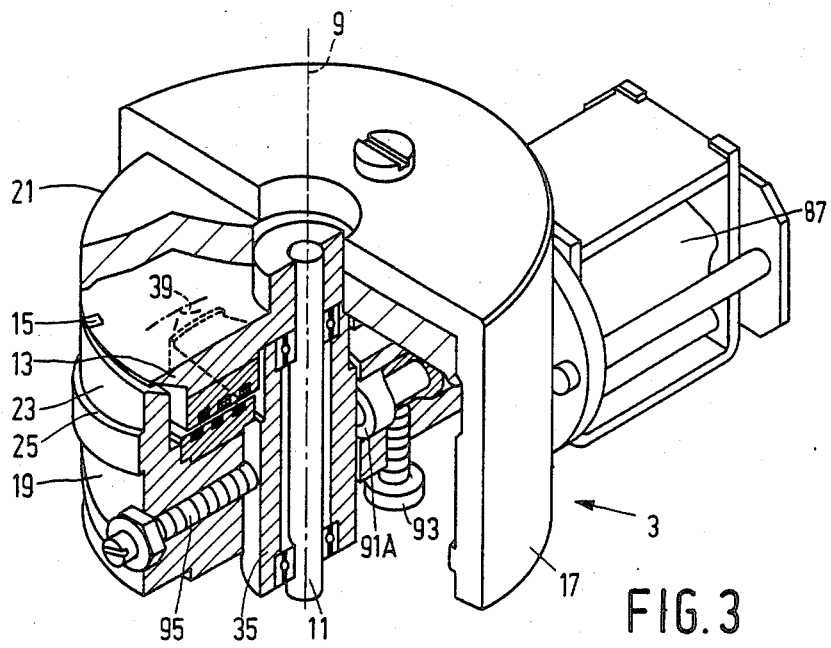
FIG. 3 is a perspective view, partly sectional view of the first embodiment, in which the head disc is shown in the stand-by position.

The operation of the device 3 in accordance with the invention will now be described in more detail with reference to FIGS. 2, 3 and 4. For the sake of clarity no magnetic tape is shown in FIGS. 2 and 3. In FIG. 2 the device 3 is in a position which is referred to hereinafter as the playing position of the head disc 10, in which position the rotating magnetic heads can record or read information on the magnetic tape. In the playing position the axis of rotation 9 of the drive shaft 11 coincides with the central axis of the stationary lower and upper drum 19 and 21. An electromagnetic device 87, which is secured to the deck plate 7, ensures that the pivotable sleeve 35 is urged against an adjustable stop 95 in the position shown in FIG. 2. The electromagnetic device 87 comprises a locating pin 89, which is axially movable into and out of the electromagnetic device through a guide sleeve 91. In the playing position of the head disc 13 the electromagnetic device 87 is energized and presses the extended locating pin 89 against the sleeve 35, so that the sleeve is clamped between the stop 95 and the locating pin 89, which in this embodiment are situated diametrically opposite each other on the normal L2 through the central guide point 45.

If the electromagnetic device 87 is switched off, is effected for example when the recording or reading (playing) process of the magnetic tape is terminated or when a pause is to be inserted in the recording or playing process, the pin 89 is automatically withdrawn by the electromagnetic device and the sleeve 35, together with the drive shaft 11 which is journalled therein and which carries the head disc 13 and the magnetic heads 15, is pivoted about the integral hinge 39 from the stop 95 against a stop edge 91A of the guide sleeve 91. The guide sleeve 91 with its stop edge is adjustable by means of a set screw 93. This situation is shown in FIGS. 3 and 4 and is referred to hereinafter as the stand-by position of the head disc 13. In the stand-by position the magnetic tape 5 remains on the guide surface 23, as is shown in FIG. 1, and the magnetic heads 15 may keep rotating without causing any wear to the magnetic heads 15 and/or the magnetic tape 5, because the magnetic heads 15 cannot contact the magnetic tape.

In this embodiment the integral hinge 39 has a neutral position indicated by the dash-dot line N in FIG. 4. In the stand-by position of the head disc the sleeve 35 is pressed against the stop edge 91A of the guide sleeve 91 (FIG. 3) by the integral hinge 39 as a result of its elasticity. An additional advantage of the above construction of the integral hinge 39 is that the pivotal movement of the sleeve 35 about the integral hinge 39, from the playing position of the head disc, to the stand-by position of this disc is initiated automatically by the integral hinge 39 itself, so that no additional provisions have to be made for this.

Figure 5:
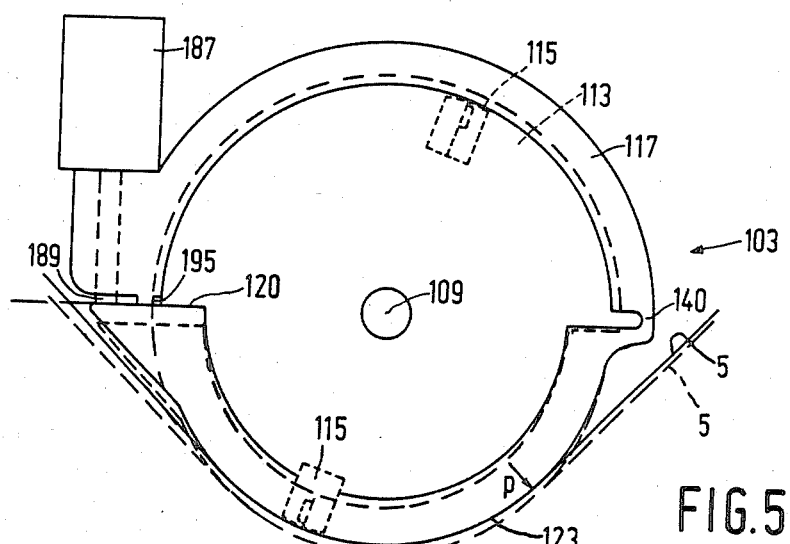
FIG. 5 is a schematic plan view of device in accordance with a second embodiment of the invention.
Figure 6:
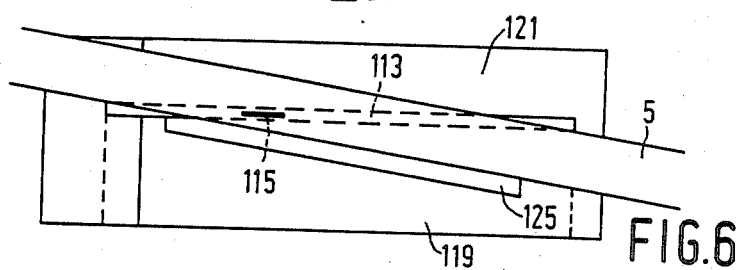
FIG. 6 is a side view of the second embodiment.

A second embodiment in accordance with the invention is shown schematically in FIGS. 5 and 6. Whenever possible the same names will be used as in the first embodiment. The device 103 comprises a mounting 117, and a head disc 113 which carries two magnetic heads 115 and which is rotatable about an axis of rotation 109. The axis 109 is stationary relative to the mounting 117. The cylindrical upper and lower drums 119 and 121 are connected to the mounting 117 by means of an elastic element 140 and are provided with a guide surface 123 and a guide edge 125 for a magnetic tape 5. The elastic element 140 is constituted by a narrow wall portion of small thickness, which extends parallel to the axis of rotation 109. Diametrically opposite the elastic element 140 the mounting 117 carries a stop 195 against which in the position shown in FIG. 5 a radially directed end portion 120 of the lower and upper drums 119 and 121 is urged as a result of the elasticity of the elastic element 140. The position shown here is the playing position of the lower and upper drums 119 and 121, in which position the rotating magnetic heads 115 can record or read signals on the magnetic tape 5 which is guided along the guide surface 123.

If recording or reading is to be interrupted temporarily, without stopping the magnetic heads 115, in accordance with the invention the lower and upper drums 119 and 121 with the guide surface 123 and the magnetic tape 5 can be pivoted about the elastic element 140 by means of the device 103 in a substantially radial direction as indicated by the arrow P, into a stand-by position in which the rotating magnetic heads 115 are not in contact with the magnetic tape 5 in order to preclude unnecessary wear to the magnetic heads 115 and/or the magnetic tape 5. The stand-by position of the lower and upper drums 119 and 121 is indicated by a broken line in FIG. 5.

An energized electromagnetic device 187 comprising an actuating pin 89 ensures that the lower and upper drums 119 and 121 are brought into and maintained in this stand-by position. The actuating pin 189 then presses against the end portion 120 of the lower and upper drums 119 and 121. The elastic element 140 produces a certain counteracting elastic force, so that a stable positioning is possible. If the electromagnetic device is switched off, the upper and lower drums 119 and 121 are pivoted back into the playing position in a direction opposite to that indicated by the arrow P, under the influence of the elasticity of the elastic element 140. In the playing position the elastic element ensures a stable abutment against the stop 195.

What is claimed is:

1. A device for magnetically recording and/or reading signals in signal tracks on a magnetic tape, comprising
   a drive shaft which is rotatable about an axis of rotation,
   a first means secured to the drive shaft, for carrying at least one magnetic head which is rotatable about the axis of the rotation in a circular path, and
   a mounting carrying a second means, having a convex circular cylindrical guide surface whose axis extends parallel to the axis of rotation, for guiding said magnetic tape around said surface and along the magnetic head,
   characterized in that one of said means is movable relative to the other means in an at least substantially radial direction between a playing position in which said guide surface is coaxial with said axis of rotation, and the rotating magnetic head is in contact with said magnetic tape which is guided by the guide surface; and a stand-by position in which said guide surface is eccentric with respect to said axis of rotation, and the rotating magnetic head is not in contact with said magnetic tape which is guided by the guide surface but is clear of said head as the head rotates, and
   said device comprises a positioning device for accurately positioning said one means in at least said playing position.

2. A device as claimed in claim 1, characterized in that the second means is movably connected to the mounting and is movable in a substantially radial direction between said playing position and said stand-by position.

3. A device as claimed in claim 2, characterized in that the second means is secured to the mounting by means of an elastic hinge in order to pivot said guide surface about a pivotal axis which extends parallel to the axis of rotation.

4. A device as claimed in claim 1, characterized in that the drive shaft carrying the first means is journalled in a member which is coaxial with the axis of rotation and which is secured to said mounting by an elastic element for moving the first means in a substantially radial direction between said operating position and said stand-by position.

5. A magnetic-tape apparatus provided with a device as claimed in claims 1 or 4, for recording and/or reading signals in signal tracks on a magnetic tape, and provided with tape-guide members for guiding the magnetic tape around said device.

6. A device for magnetically recording and/or reading signals in signal tracks on a magnetic tape, comprising a drive shaft which is rotatable about an axis of rotation, a first means secured to the drive shaft, for carrying at least one magnetic head which is rotatable about the axis of the rotation in a circular path, and a mounting carrying a second means, having a convex circular cylindrical guide surface whose axis extends parallel to the axis of rotation, for guiding said magnetic tape around said surface and along the magnetic head, characterized by comprising a member, coaxial with said axis of rotation, in which said drive shaft is journalled, and an elastic integral hinge for securing said member to said mounting, said hinge being integral with said second means and said member, having a substantially rectangular cross-section and a hinge axis which extends parallel to said axis of rotation, for moving the first means in a substantially radial direction between said operating position and said stand-by position, and a positioning device for accurately positioning the drive shaft and first means in at least said playing position.

7. A device as claimed in claim 4 or 6, characterized in that the positioning device comprises a stop on the mounting, and an electromechanical actuator for pressing the member against the stop in said playing position.

8. A device as claimed in claim 7, characterized in that the elastic element subjects the member to forces which are directed away from said stop in order to move the member from the playing position to the stand-by position.

* * * * *